US005596160A

United States Patent [19]

Aoki

[11] Patent Number: 5,596,160

[45] Date of Patent: Jan. 21, 1997

[54] PERFORMANCE-INFORMATION APPARATUS FOR ANALYZING PITCH AND KEY-ON TIMING

[75] Inventor: Eiichiro Aoki, Hamamatsu, Japan

[73] Assignee: Yamaha Corporation, Hamamatsu, Japan

[21] Appl. No.: 334,737

[22] Filed: Nov. 4, 1994

[30] Foreign Application Priority Data

Nov. 5, 1993 [JP] Japan .................................... 5-300965

[51] Int. Cl.[6] ................................ G10H 5/00; H04Q 1/18

[52] U.S. Cl. ................................ 84/653; 84/611; 84/635; 84/651; 84/477 R

[58] Field of Search ................................ 84/477 R, 609, 84/611, 634, 635, 615, 649–651, 653

[56] References Cited

U.S. PATENT DOCUMENTS

| | | | |
|---|---|---|---|
| 4,538,500 | 9/1985 | Kozuki et al. | 84/462 |
| 5,254,803 | 10/1993 | Terao | 84/609 |
| 5,315,911 | 5/1994 | Ochi | 84/477 R |
| 5,453,569 | 9/1995 | Saito et al. | 84/609 |
| 5,495,073 | 2/1996 | Fujishima et al. | 84/609 |

FOREIGN PATENT DOCUMENTS

| | | |
|---|---|---|
| 56172 | 1/1993 | Japan . |
| 5100661 | 4/1993 | Japan . |

*Primary Examiner*—William M. Shoop, Jr.
*Assistant Examiner*—Jeffrey W. Donels
*Attorney, Agent, or Firm*—Loeb & Loeb LLP

[57] ABSTRACT

A performance-information analyzing apparatus, which is employed by an electronic musical instrument, is provided to analyze performance information which represents at least a pitch and a key-on timing with respect to each sound to be produced. A note length is calculated on the basis of a key-on interval representative of a time interval between two key-on timings. One note length, whose frequency of occurrence is relatively high, is selected from among a plurality of note lengths sequentially calculated with respect to a plurality of sounds to be produced. A pair of time and location of bar-line is automatically determined in accordance with a predetermined condition on the basis of the note length selected. The selection for the note length can be made under the consideration of the number of the notes which have the same pitch and which indicate a continuous sound to be described between two measures across the bar-line in the score. Thus, the score is formed by the performance information and the pair of time and location of bar-line and is visually displayed for the user, wherein the continuous sound is described by two or more notes with a tie between two measures across the bar-line.

5 Claims, 11 Drawing Sheets

TABLE MEMORY 22

| TIME NUMBER | TIME SIGNATURE |
|---|---|
| 0 | 4/4 |
| 1 | 3/4 |
| 2 | 8/8 |
| 3 | 2/4 |
| 4 | 6/8 |
| 5 | 4/8 |

PERFORMANCE-INFORMATION APPARATUS FOR ANALYZING PITCH AND KEY-ON TIMING

BACKGROUND OF THE INVENTION

1. Field of the Invention

The present invention relates to a performance-information analyzing apparatus which is used for electronic musical instruments or the like.

2. Prior Art

Conventionally, there is provided a score displaying apparatus which sequentially reads out the performance data from the memory so as to visually display them in form of the scores.

The above-mentioned score displaying apparatus, conventionally known, requires manual operations by which the time, tempo or the like should be designated prior to the visual display of the scores. Hence, it is troublesome for the person to operate the apparatus.

SUMMARY OF THE INVENTION

It is an object of the present invention to provide a performance-information analyzing apparatus which is capable of automatically analyzing the performance information to create score information representing the score to be visually displayed.

The present invention provides a performance-information analyzing apparatus in order to analyze the performance information which represents at least a pitch and a key-on timing with respect to each sound to be produced. Herein, a note length is calculated on the basis of a key-on interval representative of a time interval between two key-on timings. One note length, whose frequency of occurrence is relatively high, is selected from among a plurality of note lengths sequentially calculated with respect to a plurality of sounds to be produced. A pair of time and location of bar-line is automatically determined in accordance with a predetermined condition on the basis of the note length selected. The selection for the note length can be made under the consideration of the number of the notes which have the same pitch and which indicate a continuous sound to be described between two measures across the bar-line in the score.

Thus, the score is formed by the performance information and the pair of time and location of bar-line and is visually displayed for the user, wherein the continuous sound is described by two or more notes with a tie between two measures across the bar-line.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

Now, the preferred embodiment of the present invention will be described with reference to the drawings.

Figure 1:
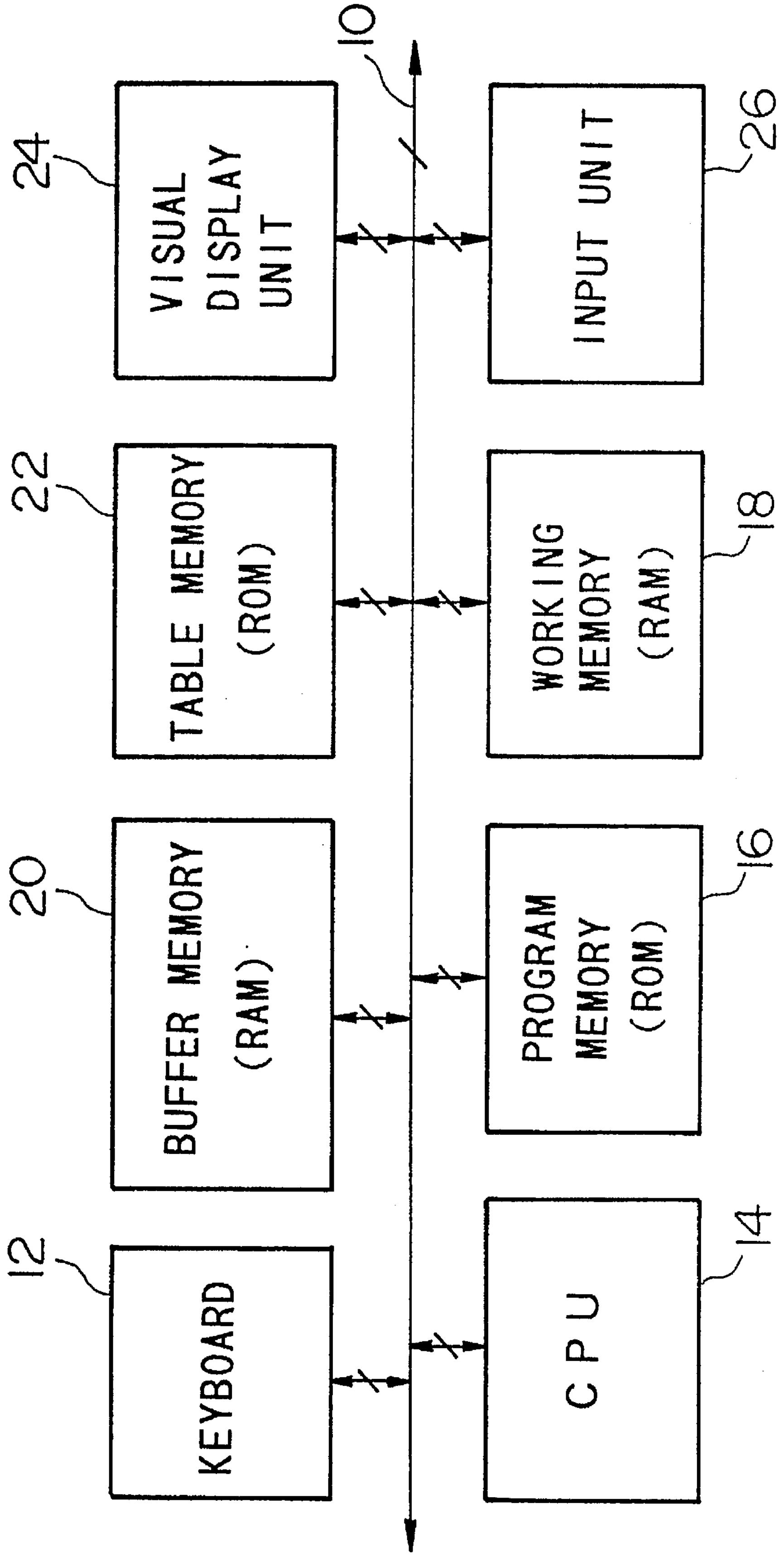
FIG. 1 is a block diagram showing a main part of an electronic musical instrument employing a performance-information analyzing apparatus according to an embodiment of the present invention.

FIG. 1 is a block diagram showing an electronic configuration of an electronic musical instrument employing a performance-information analyzing apparatus according to an embodiment of the present invention. This apparatus is designed such that the microcomputer (not shown) executes the processing regarding the performance-information analysis and the visual display of the scores. In FIG. 1, each signal line accompanied with a small slanted line is a line for the transmission of multiple-bit signals.

A bus 10 is connected with a keyboard 12, a central processing unit (i.e., CPU) 14, a program memory 16, a working memory 18, a buffer memory 20, a table memory 22, a visual display unit 24 and an input device 26. The keyboard 12 comprises a plenty of keys, each accompanied with a key switch. Hence, by scanning the states of the key switches, the keyboard 12 produces key-operation information representative of the key or keys actually operated by the performer.

The program memory 16 is configured by a read-only memory (i.e., ROM) which stores several kinds of programs. The CPU 14 executes a variety of processing, regarding the performance-information analysis and the visual display of scores, in accordance with the programs. The details of the processing will be described later with reference to FIGS. 6 to 11.

The working memory 18 is configured by a random-access memory (i.e., RAM) which contains a plenty of storage areas. Those storage areas are used as the registers, counters and the like by the CPU 14 in order to execute a variety of processing. The structure of the register, which is used specifically for the present embodiment, will be described later with reference to FIG. 5.

Figure 2A:
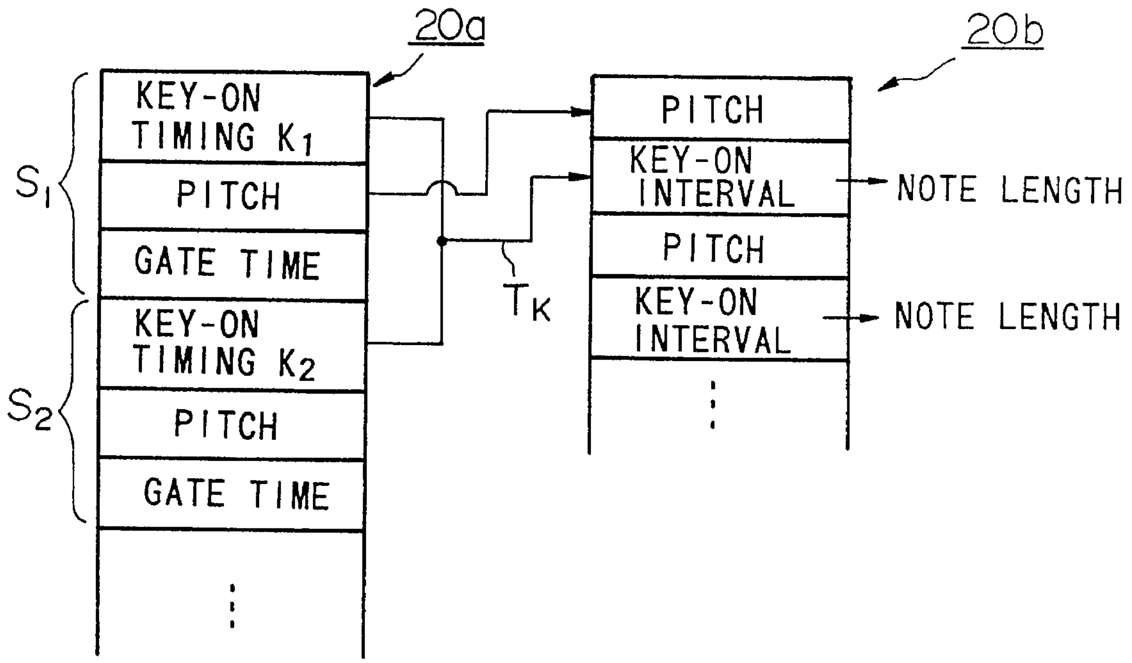
FIGS. 2A and 2B are drawings showing data formats for internal portions of a buffer memory shown in FIG. 1.
Figure 2B:
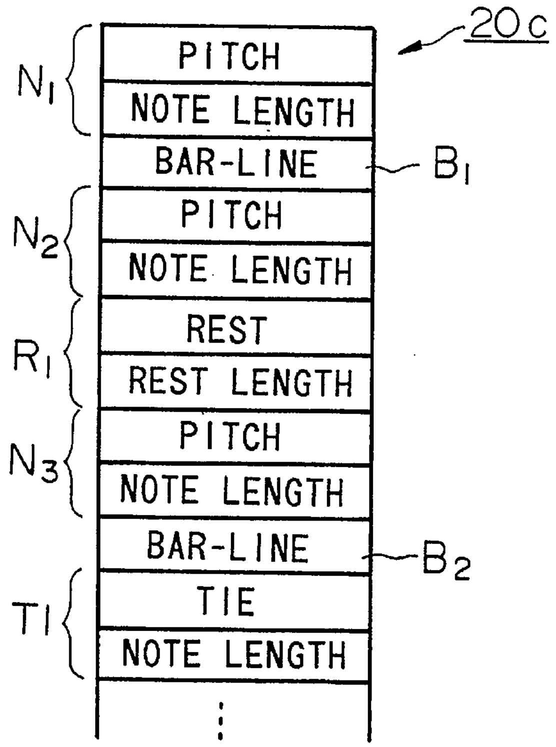
Figures 3, 4:
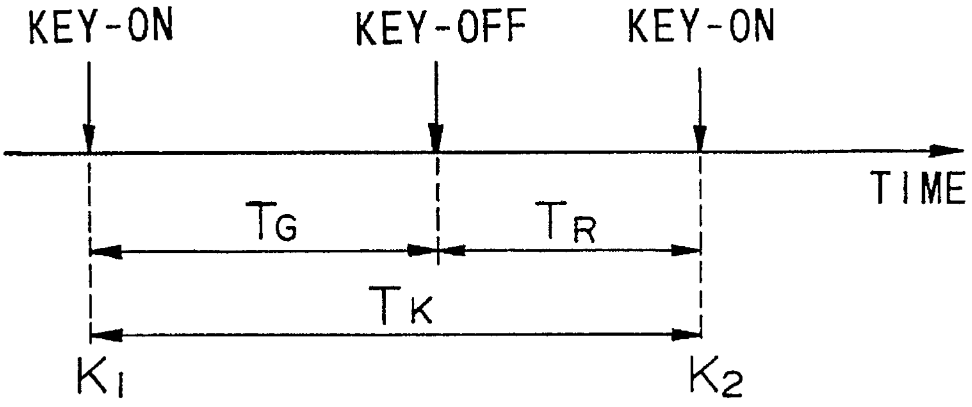
FIGS. 3 is a timing chart which is used to explain a key-on interval in connection with key-on and key-off events.
FIG. 4 is a drawing showing stored contents of a table memory shown in FIG. 1.

The buffer memory 20 is configured by a RAM which contains an input storage portion 20*a*, a buffer storage portion 20*b* (see FIG. 2A) and an output storage portion 20*c* (see FIG. 2B). The input storage portion 20*a* stores the performance information, regarding the melodies, which are inputted by operating the keyboard 12 or by operating the input device 26. The contents of the performance information inputted are shown in FIG. 2A. Herein, musical tones S1, S2, . . . are sequentially designated; hence, each of the musical tones is represented by the performance information consisting of a set of three data, i.e., key-on-timing data, pitch data and gate-time data. The key-on-timing data represent key-on timings K1, K2, . . . as shown in FIG. 3. The pitch data represents a pitch of the musical tone. The gate-time data represents a time for sustaining the sounding, which is measured between a key-on timing and a key-off timing. Hereinafter, this time will be called a sound-sustaining time.

The buffer storage portion 20*b* stores a pair of pitch data and key-on-interval data with respect to each musical tone as shown in FIG. 2A. The pitch data, to be stored in the buffer storage portion 20*b*, is transferred from the input storage portion 20*a*. The key-on-interval data represents a time interval between the key-on timings, which is calculated by an equation as follows:

$$T_K=K2-K1$$

Each key-on-interval data is converted into note-length data by executing quantization processing, the contents of which Will be described later.

The output storage portion 20*c* stores the score data which is created from the performance data which are stored in the input storage portion 20*a*. An example of the contents of the score data is shown in FIG. 2B. Herein, the score data contains a pair of pitch data and note-length data for a note N1, bar-line data B1, a pair of pitch data and note-length data for a note N2, a pair of rest data and rest-length data for a rest R1, a pair of pitch data and note-length data for a note N3, a bar-line data B2 and a pair of tie data and note-length data for a tie TI, for example.

The note-length data for the note N1 or the like indicates a note length or a duration which corresponds to a sound-sustaining time $T_G$ shown in FIG. 3. If one musical tone, represented by two or more notes, is continuously sounded between two measures across the bar-line 'B2' (see FIG. 2B), its note-length data is divided into two note-length data, wherein first note-length data accompanies with the pitch data for the note N3, which is placed before the bar-line B2, and second note-length data accompanies with the tie data for the tie TI. The rest-length data for the rest R1 indicates a rest length or a duration which is expressed by an equation as follows:

$$T_R=T_K-T_G$$

The table memory 22 is configured by a ROM. An example of the contents of data stored in the table memory 22 is shown by FIG. 4. Serial numbers '0', '1', '2', '3', '4' and '5' (hereinafter, referred to as time numbers) are respectively assigned to time signatures '4/4', '3/4', '8/8', '2/4', '6/8' and '4/8', which are stored as time data.

Figure 11A:
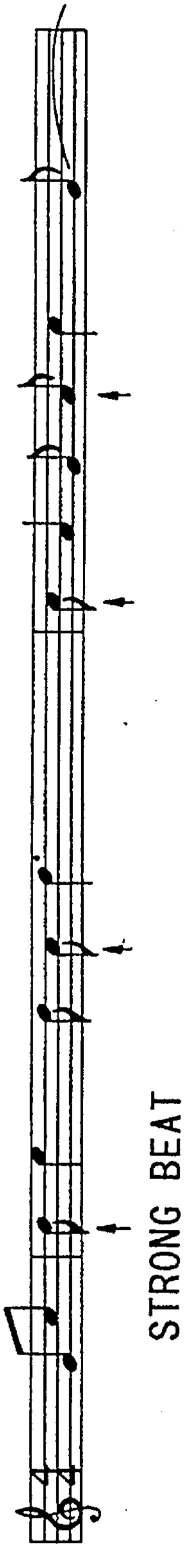
FIGS. 11A to 11C are drawings showing a variety of scores.
Figure 11B:
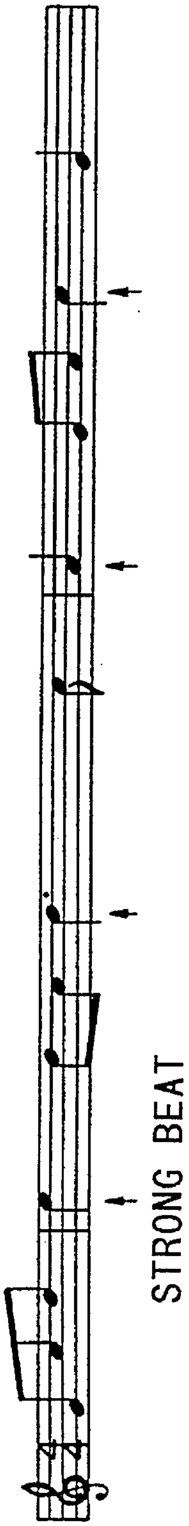

The visual display unit 24 is capable of visually displaying the score as shown in FIG. 11B. The visual display unit 24 comprises a screen for the CRT display or liquid-crystal display.

The input device 26 is provided to input the performance information from an electronic musical instrument externally provided. As the input device 26, it is possible to use a receiver unit which is designed for the standard of Musical Instrument Digital Interface (i.e., MIDI standard).

Next, the registers specifically used for the present embodiment will be described. Among the registers which are set in the working memory 18, thirteen kinds of registers (1) to (13) concern with the present embodiment. (1) Key-on-interval register 'DMAX'

By using the key-on-interval data '$T_K$', an interval-unit number 'KI' is calculated in unit of 20ms in accordance with an equation as follows:

$$KI=T_K/20$$

Figure 5:
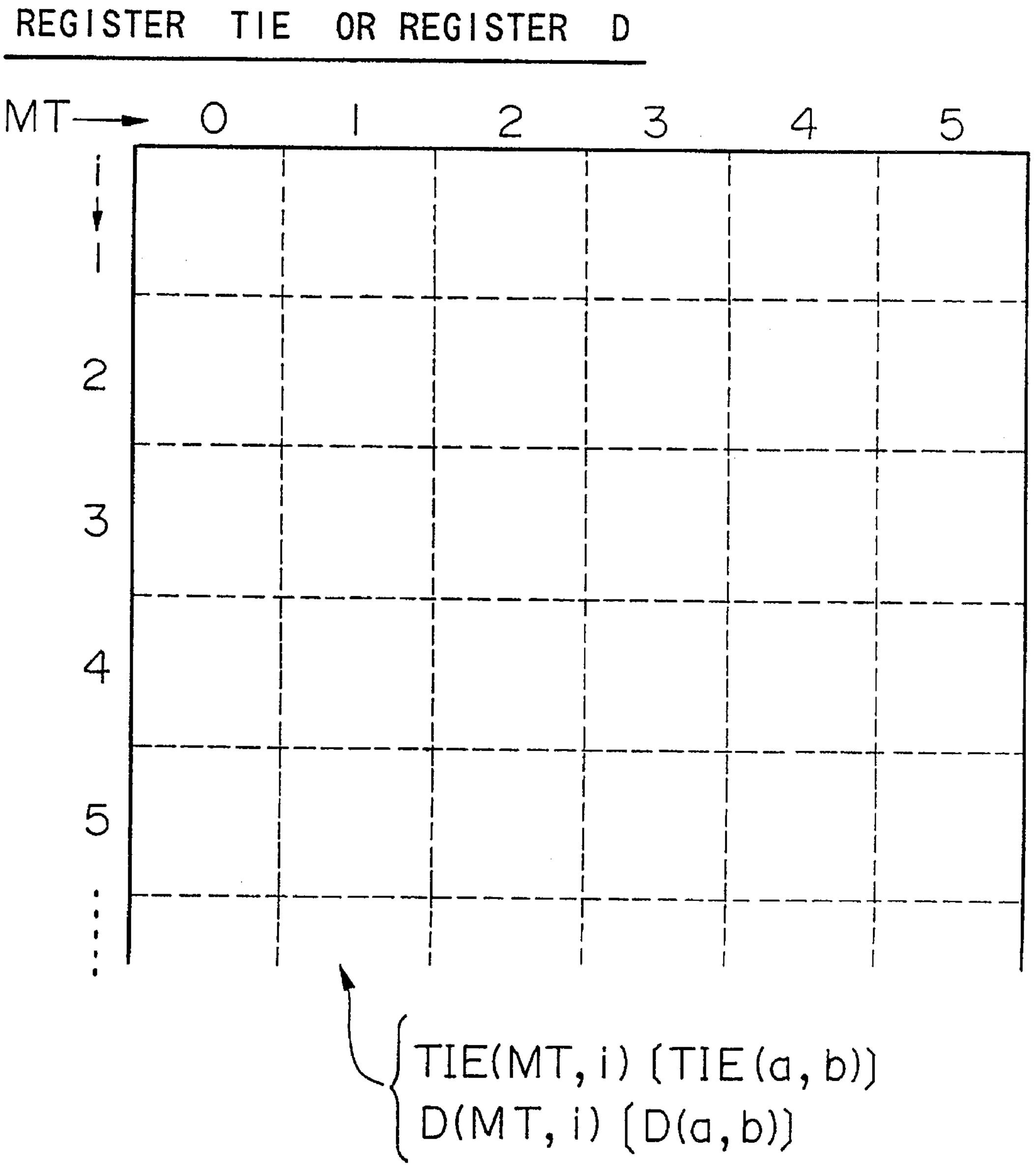
FIG. 5 is a drawing showing an arrangement of storage areas in a register TIE or D.

Then, a frequent-interval-unit number "$KI_{MAX}$", which occurs most frequently in a certain period of time, is selected from among the interval-unit numbers sequentially calculated; and then, that number $KI_{MAX}$ is set in the key-on-interval register DMAX. (2) Bar-length register $T_1$ for normal notes The bar length based on the normal notes such as the quarter note (i.e., crotchet) and eighth note (i.e., quaver) is set to the bar-length register $T_1$, wherein the bar length is defined by the number of crotchet beats corresponding to the duration in which one or more normal notes are played. (3) Bar-length register $T_2$ for grouped notes The bar length based on the grouped notes, such as the grouped three-notes (e.g., triplet), grouped six-notes (e.g., sextuplet) and the like, is set to the bar-length register $T_2$, wherein the bar length is defined by the number of crotchet beats corresponding to the duration in which the grouped notes are played. For example, if a triplet is employed for the grouped three-notes, a group of three quarter notes are played in time of 2. In the case of the grouped six-notes, a group of six notes, e.g., a group of six sixteenth notes, are played in time of 5. (4) Note-length register $QR_1$ for normal notes Based on the bar length set in the register $T_1$, the key-on-interval data is converted into note-length data, which is set in the note-length register $QR_1$. (5) Note-length register $QR_2$ for grouped notes Based on the bar length set in the register $T_2$, the key-on-interval data is converted into note-length data, which is set in the note-length register $QR_2$. (6) Note-number register $N_1$ for normal notes The number of normal notes is calculated from the note-length data set in the register $QR_1$; and this number is set in the note-number register $N_1$. (7) Note-number register $N_2$ for grouped notes The number of grouped notes is calculated from the note-length data set in the register $QR_2$; and this number is set in the note-number register $N_2$. (8) Bar-length register $T_O$ The number of normal notes, which corresponds to the bar length set in the register $T_1$, is compared with the number of grouped notes, which corresponds to the bar length set in the register $T_2$; and then, one of them, which is greater than another of them, is selected and the corresponding bar length is set in the bar-length register $T_0$. (9) Tempo register TEMPO Tempo data representative of a tempo value, which is indicated by the number of crotchets to be played in one minute, is calculated from the bar length set in the register $T_0$; and this tempo data is set in the tempo register TEMPO. (10) Time-number register MT One of the aforementioned time numbers 0–5 is set in the time-number register MT. (11) Variable register i A variable, which is selected from integral numbers '1', '2','3', . . . is set in the variable register i. (12) Tie register TIE The tie register TIE provides a matrix of storage areas as shown in FIG. 5, wherein each column is represented by each of the time numbers 0–5 set in the register MT, while each row is represented by each of the variables set in the register. Herein, each storage area stores the number of notes representative of one sound which is continuously sounded between two measures across the bar-line. If the time number is denoted by a symbol 'TM' and the variable is denoted by a symbol 'i', each storage areas is specified by a coordinate-like symbol "TIE(MT,i)"; and its stored value is expressed by "TIE(a.b)". (13) Note-length-difference register D The structure of the note-length-difference register D is similar to the structure of the tie register TIE (see FIG. 5). Herein, a note-length difference is calculated by subtracting an average value, among the note lengths for weak-beat timings, from an average value among the note lengths for strong-beat timings; hence, each of the storage areas of the note-length-difference register D stores the note-length difference. As similar to the tie register TIE, each storage area of the note-length-difference register D is specified by a symbol "D(MT,i)" and its stored value is expressed by a symbol "D(a,b)".

Next, the operations of the present embodiment will be described with reference to the flowcharts.

Figure 6:
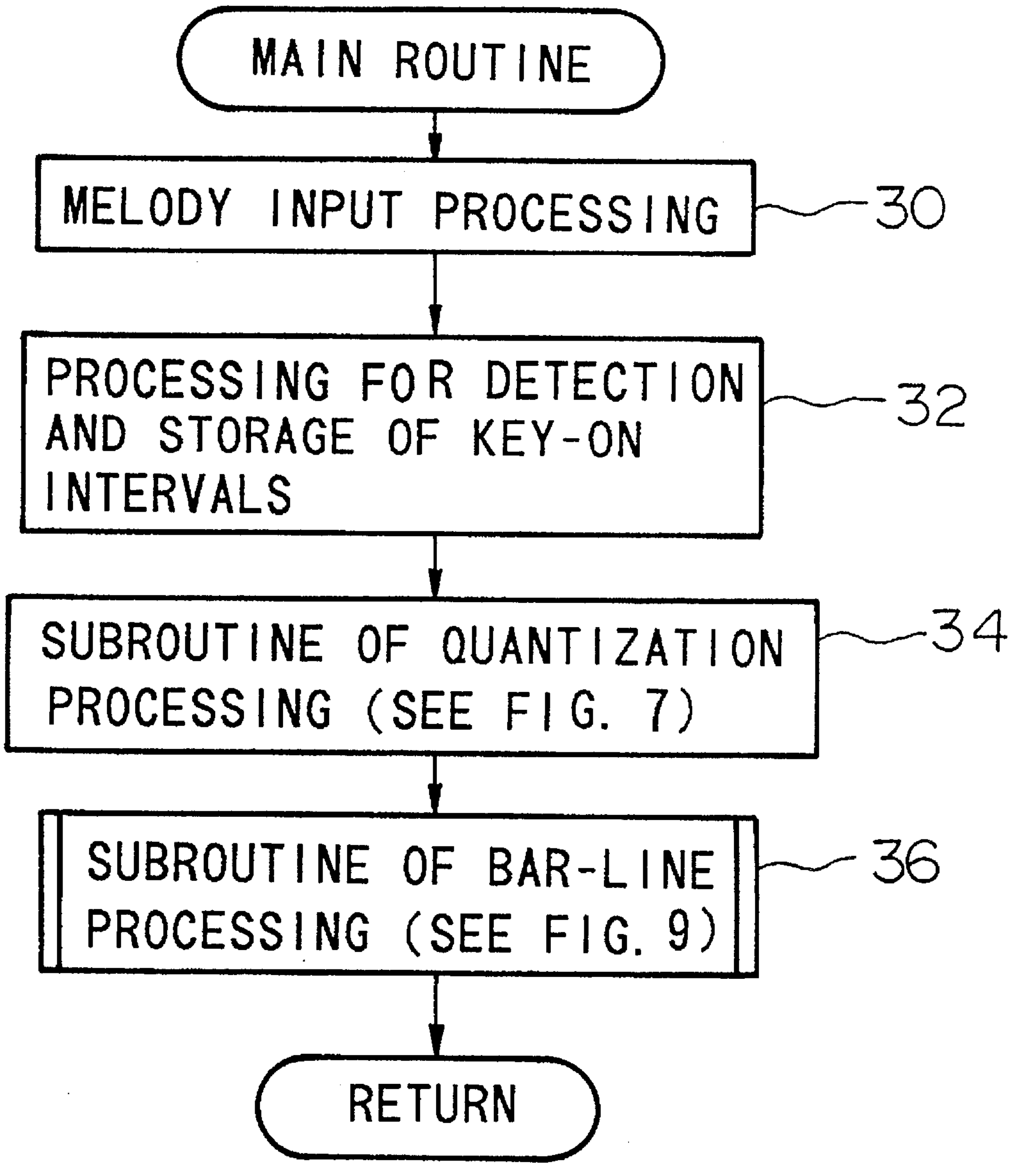
FIG. 6 is a flowchart showing a main routine executed by a CPU shown in FIG. 1.

FIG. 6 shows a main routine for the performance-information analyzing processing. In first step 30 of the main routine, a melody input processing is performed in connection with the keyboard 12 or the input device 26. Through the melody input processing, melody-performance data are stored in the input storage portion 20a of the memory 20 as shown in FIG. 2A.

In step 32, processing for the detection and storage of the key-on intervals is performed. Herein, the key-on-interval data, representative of the difference between the key-on timings, is calculated by the aforementioned equation of "$T_K=K_2-K_1$" with respect to each of the musical tones S1, S2, . . . sequentially designated. Then, each key-on-interval data, accompanied with the pitch data, is stored in the buffer storage portion 20b shown in FIG. 2A.

In step 34, a subroutine of quantization processing is executed. In next step 36, a subroutine of bar-line processing is executed. The contents of those subroutines will be described in detail with reference to the flowcharts shown in FIGS. 7, 9A and 9B respectively.

Figure 7:
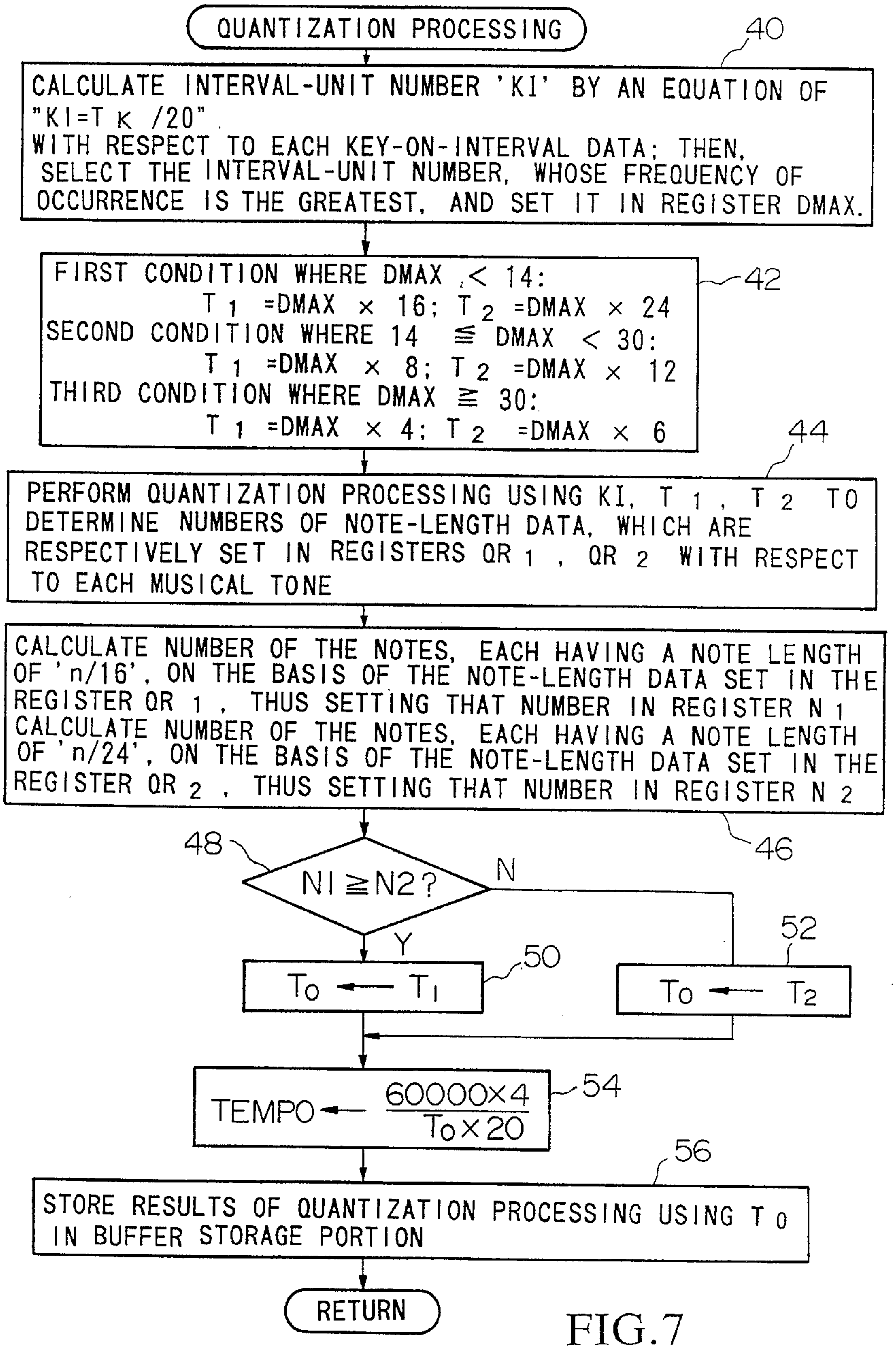
FIG. 7 is a flowchart showing a subroutine of quantization processing.

FIG. 7 shows the subroutine of quantization processing. In first step 40 of this subroutine, the aforementioned interval-unit number KI is calculated with respect to each key-on-interval data $T_K$, stored in the buffer storage area 20b, by the aforementioned equation of "$KI=T_K/20$"; and then, the frequent-interval-unit number $KI_{MAX}$ is set in the register DMAX. If the key-on interval of $T_K$=600 [ms] occurs most frequently, the frequent-interval-unit number $KI_{MAX}$ is calculated as follows:

$$KI_{MAX}=600/20=30$$

Hence, that number '30' is set in the register DMAX. Incidentally, if there exist multiple key-on intervals, whose frequency of occurrence is the greatest, the largest key-on interval is selected and is set in the register DMAX.

In step 42, a conditional judgement is made using three conditions as follows: (i) first condition where DMAX<14; (ii) second condition where 14≦DMAX<30; and (iii) third condition where DMAX≧30. If the number set in the register DMAX coincides with one of those conditions, certain numbers, each of which is a multiple of the number 'DMAX', are set in the registers $T_1$ and $T_2$, as follows:

| | (register $T_1$) | (register $T_2$) |
|---|---|---|
| (i) first condition | DMAX × 16 | DMAX × 24 |
| (ii) second condition | DMAX × 8 | DMAX × 12 |
| (iii) third condition | DMAX × 4 | DMAX × 6 |

In next step 44, the quantization processing is performed on the interval-unit number KI in response to the numbers set in the registers $T_1$ and $T_2$ respectively so as to produce results of the quantization processing, which are respectively set in the registers $QR_1$ and $QR2_2$.

Figure 8:
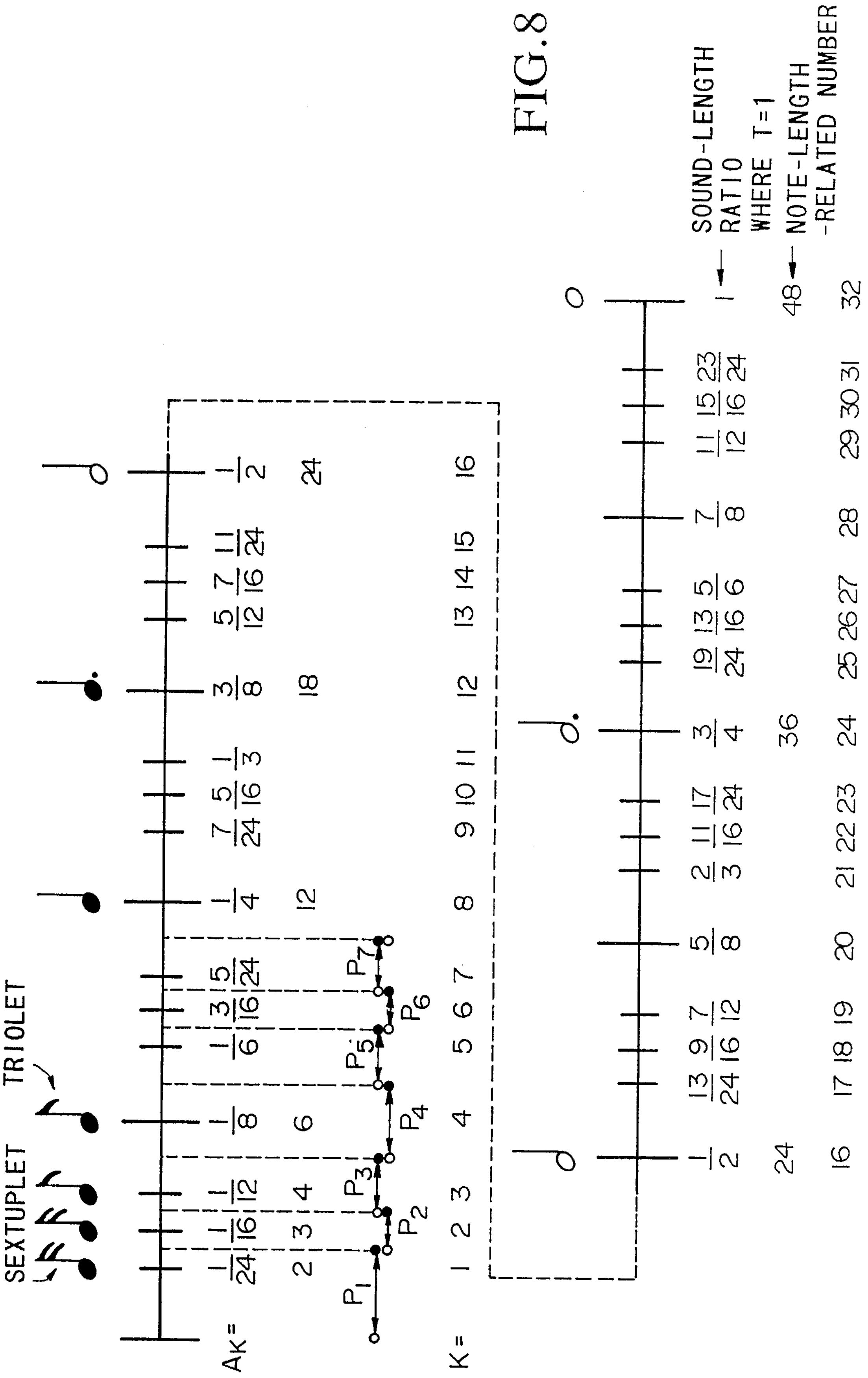
FIG. 8 is a drawing which is used to explain the quantization processing.

FIG. 8 is a diagram which is used to explain the quantization processing. Herein, there are illustrated a variety of notes, such as sixteenth notes for the grouped six-notes, eighth notes for the grouped three-notes, quarter notes, half notes and whole note. Each of the notes illustrated is accompanied with the number of the sound-length ratio '$A_K$', wherein the number of $A_K$ is determined using a unit number '1' which indicates the bar length 'T'. The sound-length ratio $A_K$ ranges from '1/24' to '1'. In addition, a note-length-related number is calculated in response to each of the sound-length ratios which range between '1/24 'and '1', wherein the note-length-related number is defined as the counted number for the tempo-clock pulses. Further, the number of 'K' is determined responsive to the note-length-related number calculated; hence, the number of 'K' ranges from '1' to '32'. In FIG. 8, each of symbols $P_1$ to $P_7$ represents a range in which the specific number is maintained for the interval-unit number KI.

By using the bar length T set in the registers $T_1$ and $T_2$, the note-length-related number is determined in accordance with conditional calculations (1) and (2), relating to the interval-unit number KI, which are described below.

(1) Under the condition where 0<KI≦(5/96)T, the interval-unit number KI is forced to be set equal to "(1/24)T"; and the note-length-related number is set at '2'.

(2) Under the condition where $(A_{K-1}+A_K)/2<KI\leqq(A_K+A_{K+1})/2$, the interval-unit number KI is forced to be set equal to "$A_K\times T$"; and the note-length-related number is set equal to "$A_K\times$48".

The above-mentioned condition (1) corresponds to the range $P_1$ for KI; and the condition (2) corresponds to a wider range containing the ranges $P_2$, $P_3$, $P_4$, $P_5$, $P_6$ and $P_7$ for KI.

By performing the quantization processing, the register $QR_1$ stores the note-length data, representative of the note-length-related number which is determined responsive to the interval-unit number KI under the state where $T=T_1$, with respect to each of the musical tones. In addition, the register $QR_2$ stores the note-length data, representative of the note-length-related number which is determined responsive to the interval-unit number KI under the state where $T=T_2$, with respect to each of the musical tones.

In step 46, the number of the notes, each having a note length of n/16 (where 'n' is an integral number such as '1', '2', '3', . . . ), is calculated on the basis of the note-length data set in the register $QR_1$; and then, that number calculated is set in the register $N_1$. In addition, the number of the notes, each having a note length of n/24, is calculated on the basis of the note-length data set in the register $QR_2$; and then, that number calculated is set in the register $N_2$. Thereafter, the CPU 14 proceeds to step 48.

In step 48, a Judgement is made as to whether or not the number set in the register $N_1$ is equal to or greater than the number set in the register $N_2$. If a result of the judgement is affirmative, which is represented by a letter 'Y', the CPU 14 proceeds to step 50 in which the note length set in the register $T_1$ is set to the register $T_0$. In contrast, if the result of judgement is negative, which is represented by a letter 'N', the CPU 14 proceeds to step 52 in which the note length set in the register $T_2$ is set to the register $T_0$.

When completing the step 50 or 52, the CPU 14 proceeds to step 54 in which a tempo-value calculating processing is performed. That is, by using the note length of the register $T_0$, which is also represented by the symbol '$T_0$', the tempo value 'TP' is calculated in accordance with an equation as follows:

$$TP=(60000\times4)/(T_0\times20)$$

In the above equation, the number '60000' indicates the number of milli-seconds included in one minute; that is, one minute equals to 60000 milli-seconds. The tempo value TP calculated is set in the register TEMPO.

After the completion of the calculation in step 54, the CPU 14 proceeds to step 56 in which the interval-unit number KI is quantized in response to the note length set in the register $T_0$. Then, a result of the quantization is stored in the buffer storage portion 20*b* of the memory 20 (see FIG. 2A). Herein, as similar to the foregoing step 44, the step 56 produces the note-length data representative of the note-length-related number in response to the interval-unit number KI by using the aforementioned conditional calculations (1) and (2) where 'T' is replaced by '$T_0$'. Then, the note-length data, paired with the pitch data, is stored in the buffer storage area 20*b* with respect to each musical tone. As a result, the key-on-interval data, which is originally stored in the buffer storage area 20*b*, is rewritten by the corresponding note-length data. After the completion of tile step 56, the execution of the CPU 14 returns back to the main routine shown in FIG. 6.

Figure 9A:
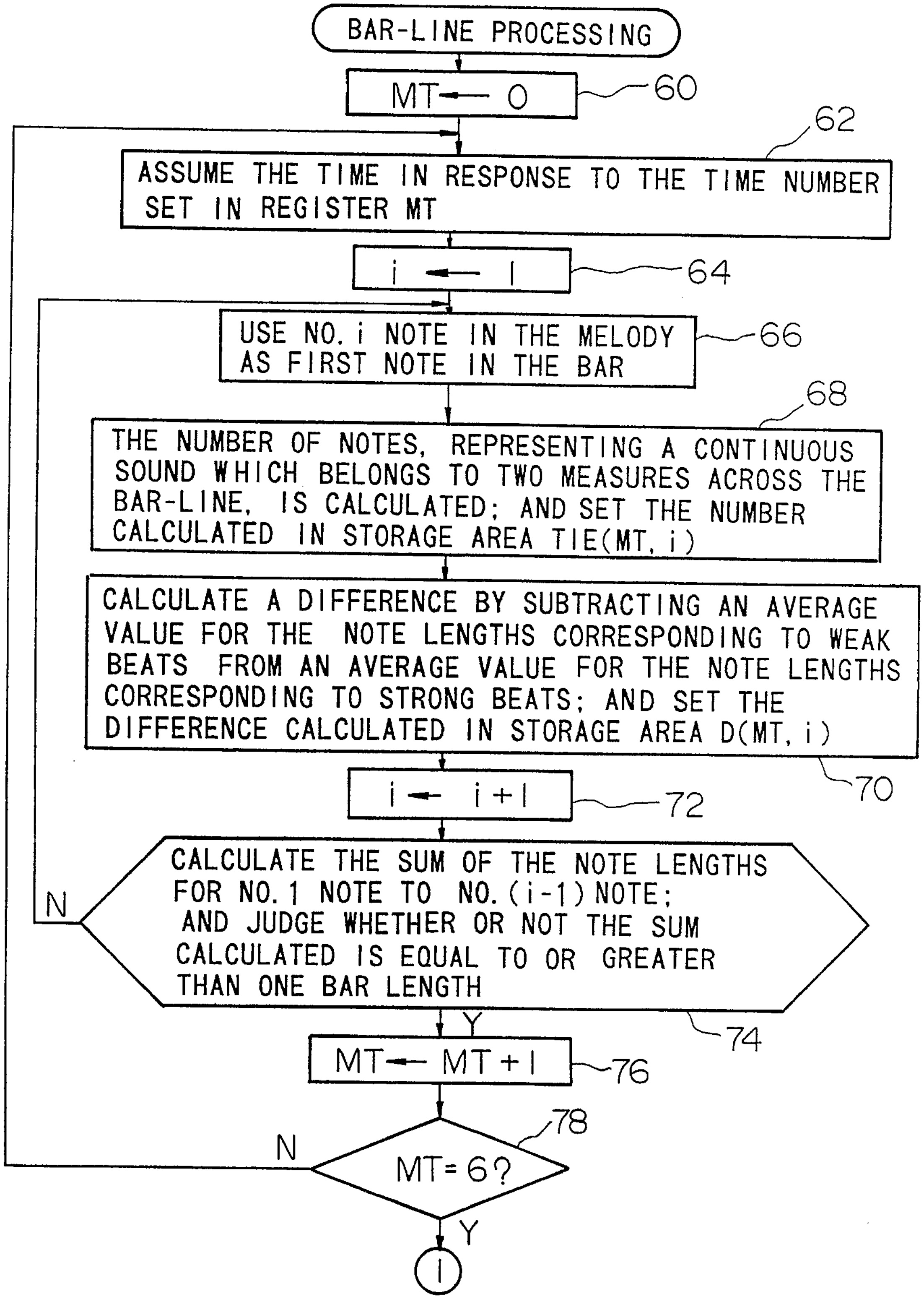
FIGS. 9A and 9B are flowcharts showing a subroutine of bar-line processing.
Figure 9B:
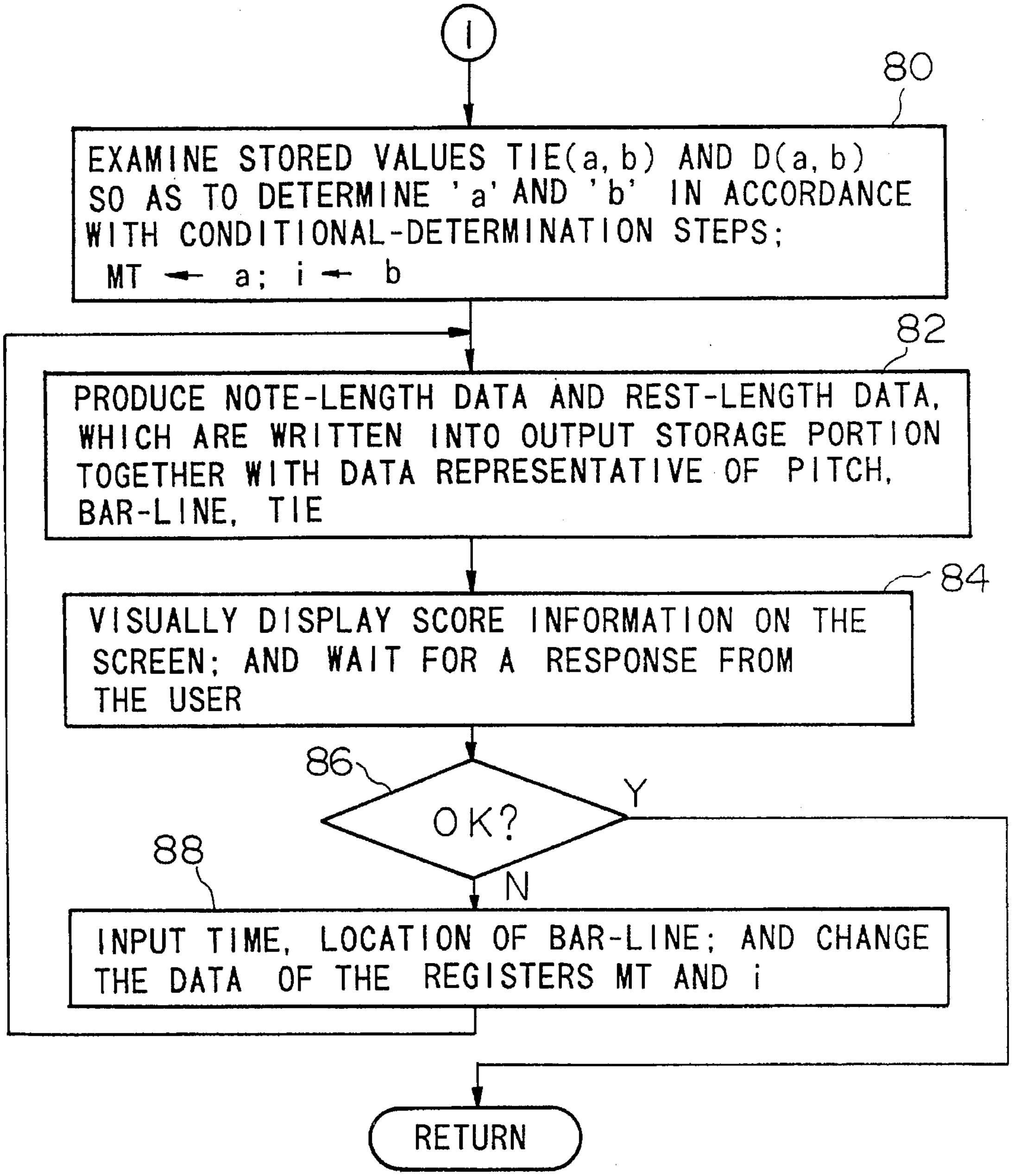

FIGS. 9A and 9B show a subroutine of bar-line processing. In first step 60 of this subroutine, the time number '0' (which corresponds to 4/4 time) is set in the register MT. In next step 62, it is assumed that the time corresponding to the time number set in the register MT is the time which is used to determine the location of bar-line.

In step 64, a number '1' is set in the register i. In step 66, the note corresponding to the number set in the register i is used as the first note in the bar, the data of which are stored in the buffer storage portion 20*b* of the memory 20. If the CPU 14 firstly proceeds to step 66 after setting the number '1' in the register i in step 64, the note corresponding to the number '1' is used as the first note in the bar. Thereafter, the CPU 14 proceeds to step 68.

Figure 10A:
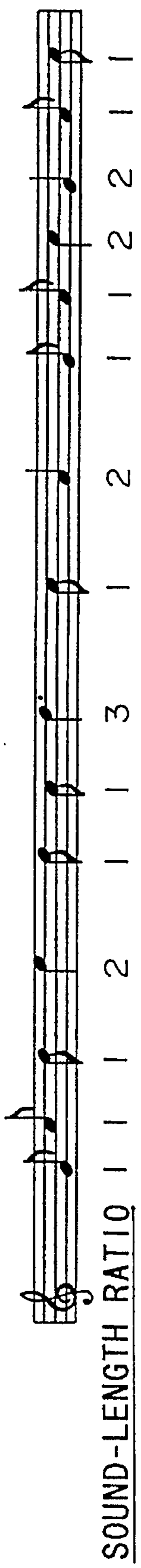
FIGS. 10A to 10C are drawings showing a variety of scores.
Figure 10B:
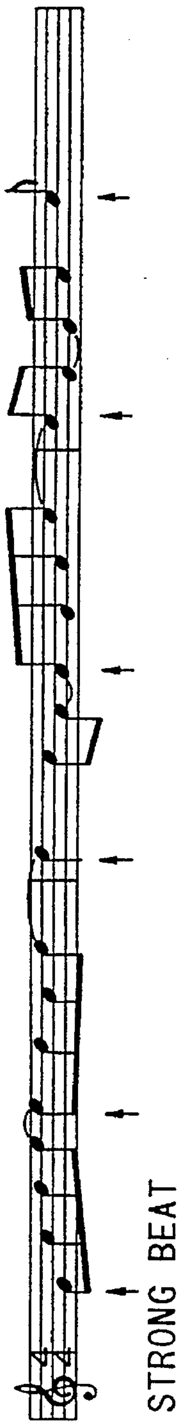

In step 68, the number of the notes, indicating one sound which continues between two measures across the bar-line, is calculated in accordance with the stored contents of the buffer storage portion 20*b* as well as the conditions which are set by the steps 62–66. Then, the number calculated is set at the storage area TIE(MT,i) in the register TIE. FIGS. 10A, 10B and 11A show several kinds of two notes, accompanied with the tie, which indicate one sound continuing between two measures across the bar-line.

In step 70, the CPU 14 calculates an average value Ka for the note lengths corresponding to the strong beats as well as an average value Kb for the note lengths corresponding to the weak beats in accordance with the stored contents of the buffer storage portion 20*b* and the conditions set by the steps 62–66; and then, a difference between them, i.e., "Ka-Kb", is set in the storage area D(MT,i) of the register D. In FIGS. 10B, 10C and FIGS. 11A–11C, each note indicated by an arrow corresponds to the strong beat.

In step 72, the number of the register i is increased by '1'. In step 74, the CPU 14 calculates the sum of the note lengths for No. 1 note to No.(i-1) notes (where 'i' indicates the number set in the register i); and then, a judgement is made as to whether or not the sum of the note lengths calculated is equal to or greater than one bar length. If the CPU 14 firstly proceeds to step 72 after the number '1' is set in the register i, the number 'i' is increased to '2' by the step 72. In that case, only the No. 1 note relates to the calculation of the sum of the note lengths; hence, if the note length of the No. 1 note is less than one bar length, a result of the judgement made by the step 74 is negative (N).

If the result of Judgement in step 74 is negative (N), the execution of the CPU 14 returns back to the aforementioned step 66; thereafter, the aforementioned steps 66–72 are repeated. Thereafter, when the result of judgement in step 74 turns to be affirmative (Y), the CPU 14 proceeds to next step 76.

In the step 76, the time number of the register MT is increased by '1'. In step 78, a judgement is made as to whether or not the time number increased by the step 76 is equal to '6'. If the time number is equal to '6', it is declared that the processing for all of the time numbers 0–5 is completed. Now, when the CPU 14 firstly proceeds to step 76 after setting the time number '0' in the register MT by the step 60, the time number is increased to '1' by the step 76. In that case, a result of the judgement made by the step 78 is negative (N).

When the result of judgement in step 78 is negative (N), the execution of the CPU 14 returns back to the step 62; and then, the steps 62–76 are repeated. After completing those steps with respect to all of the time numbers 0–5, the result of judgement in step 78 turns to be affirmative (Y); hence, the CPU 14 proceeds to next step 80 (see FIG. 9B).

In step 80, the CPU 14 examines the stored value TIE(a,b) of the register TIE and the stored value D(a,b) of the register D so as to determine the numbers 'a' and 'b' in accordance with conditional-determination steps which are determined in advance. Those numbers are respectively set in the registers MT and i. The present embodiment uses four conditional-determination steps (J1) to (J4), which will be described below.

(J1) The CPU 14 searches the stored values of the register TIE so as to select one stored value which is the smallest; hence, the CPU 14 determines the numbers 'a' and 'b' in accordance with the stored value TIE(*a,b*) selected.

(J2) If there exist multiple stored values of the register TIE, each of which is the smallest, the CPU 14 selects one stored value TIE(a,b) in which the number 'b' is the smallest; hence, the CPU 14 determines the numbers 'a' and 'b' in accordance with the stored value TIE(a,b) selected.

(J3) If there exist multiple stored values of the register TIE, each of which is the smallest and in each of which the number 'b' is the smallest, the CPU 14 selects one stored value D(a,b) which is the largest; hence, the CPU 14 determines the numbers 'a' and 'b' in accordance with the stored value D(*a,b*) selected.

(J4) If there exist multiple stored values of the register D, each of which is the largest, the CPU 14 selects one stored value D(a,b) in which the number 'a' is the smallest; hence, the CPU 14 determines the numbers 'a' and 'b' in accordance with the stored value D(a,b) selected.

Among the above-mentioned conditional-determination steps (J1) to (J4), the step (J1) is given a highest priority, while the step (J4) is given a lowest priority. In other words, the numbers 'a' and 'b' are determined by using the steps (J1) to (J4) in that order.

In step 82, the CPU 14 produces the note-length data and rest-length data; and then, those data, together with several kinds of data representative of the pitch, bar-line, tie and the like, are written into the output storage portion 20*c* of the memory 20 (see FIG. 2B).

The note-length data is obtained by converting the gate-time data, stored in the input storage portion 20*a*, in accordance with the tempo data stored in the register TEMPO. As for the case of FIG. 3 in which the key-off event occurs in the key-on interval '$T_K$', the rest-length data is obtained by subtracting the note-length data based on the gate-time data from the note-length data which is based on the key-on-interval data and is stored in the buffer storage portion 20*b*.

In short, the rest-length data is obtained by an equation as follows:

$$T_R = T_K - T_G$$

As shown in FIG. 2B, the note-length data is stored in the output storage portion 20c with being paired with the pitch data in connection with each of the notes $N_1$, $N_2$, . . . The rest-length data is stored in the output storage portion 20c in connection with the rest $R_1$, for example. The bar-line data is stored in the output storage portion 20c in accordance with the time, indicated by the time number set in the register MT, as well as the location of bar-line indicated by the variable set in the register i. If one continuous sound, represented by two notes which are respectively located before and after the bar-line, is used as shown in FIG. 2B, its note-length data is divided into first and second note-length data with respect to the bar-line; hence, the output storage portion 20c stores the first note-length data, bar-line data, tie data and second note-length data in turn. After the completion of the step 82, the CPU 14 proceeds to step 84.

In the step 84, the score data, which is configured by a variety of data stored in the output storage portion 20c, is displayed on the screen of the visual display unit 24 in the form of the score. Then, the CPU 14 waits for a response made by the user. When the user sends 'OK' message, a result of judgement in step 86 turns to be affirmative (Y), so that the execution of the CPU 14 returns back to the main routine shown in FIG. 6.

If the result of judgement in step 86 is negative (N), the CPU 14 proceeds to next step 88. In the step 88, the user inputs a variety of information representative of the time, location of bar-line and the like; hence, the CPU 14 changes the data stored in the registers MT and i in accordance with the information inputted. Thereafter, the execution of the CPU 14 returns to the step 82; thus, the CPU 14 rewrites the data representative of the bar-line, tie and the like in response to the changed data of the registers MT and i. In next step 84, the visual display unit 24 displays the score on the screen in accordance with a variety of data rewritten. If the user sends OK message, the execution of the CPU 14 returns back to the main routine shown in FIG. 6 by means of the step 86.

FIGS. 10A–10C and FIGS. 11A–11C shows a variety of scores which are used to explain the aforementioned conditional-determination steps (J1) to (J4). In the score of FIG. 10A, the notes, which are inputted by the user and are stored in the buffer storage portion 20b, are shown with the sound-length ratios.

Figure 10C:
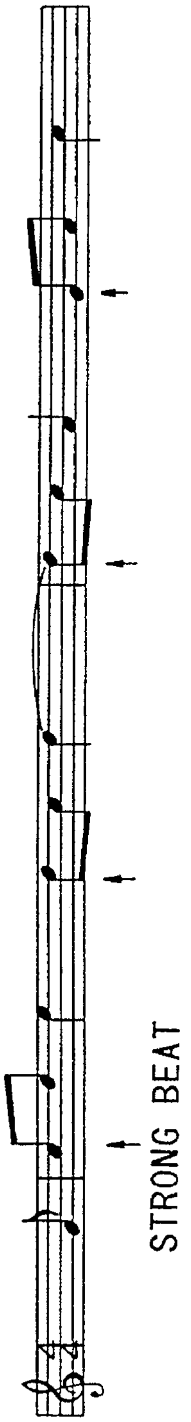
Figure 11C:
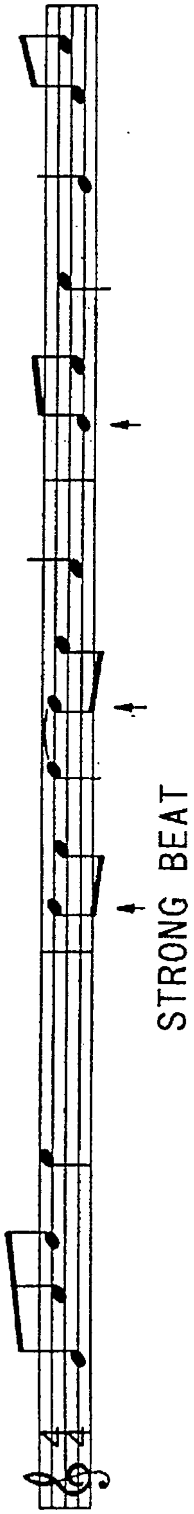

The scores of FIGS. 10B, 10C and FIGS. 11A, 11B and 11C use the same time, i.e., 4/4 time. FIG. 10B shows the score in which a bar-line is located prior to No. 1 note inputted; FIG. 10C shows the score in which a bar-line is located prior to No. 2 note inputted; FIG. 11A shows the score in which a bar-line is located prior to No. 3 note inputted; FIG. 11B shows the score in which a bar-line is located prior to No.4 note inputted; and FIG. 11C shows the score in which a bar-line is located prior to No.5 note inputted. In each of the scores of FIGS. 10B, 10C and 11A, there exists a continuous sound represented by two notes located in two measures across the bar-line. The scores of FIGS. 11B and 11C do not contain such continuous sound. Therefore, the aforementioned conditional-determination step (J1) is suitable for the scores of FIGS. 11B and 11C.

As compared to the score of FIG. 11C, the score of FIG. 11B has a smaller number for 'b' because the score of FIG. 11B has a smaller number of notes corresponding to the weak beats. Hence, the conditional-determination step (J2) is suitable for the score of FIG. 11B. Even if both of the scores of FIGS. 11B and 11C have the same number 'b', the score of FIG. 11B has a larger average value for the note lengths corresponding to the strong beats. Hence, the conditional-determination step (J3) is suitable for the score of FIG. 11B. If an assumption is made such that both of the scores of FIGS. 11B and 11C have the same stored value D(a,b), the score of FIG. 11B has a smaller number for 'a' if 4/4 time is set for the score of FIG. 11B but 3/4 time is set for the score of FIG. 11C. In that case, the conditional-determination step (J4) is suitable for the score of FIG. 11B.

In the above-mentioned example using the score of FIG. 11B, the CPU 14 determines the numbers 'a' and 'b' as "a=MT=" and "b=i=4" while setting the time at '4/4' and locating the bar-line prior to the No. 4 note inputted.

Incidentally, the present invention is not limited by the embodiment described heretofore. Hence, it is possible to modify the present embodiment within the scope of the invention. Examples of the modification will be described below.

(1) It is possible to modify the present embodiment such that in the quantization processing, fuzzy-inference theory is employed to compute the value of the register DMAX so as to determine the note length whose frequency of occurrence is relatively high.

(2) It is possible to modify the present embodiment such that velocity data representative of the intensity or velocity to depress the key is inputted and is used for the judgement which is made as to whether the current beat is the strong beat or weak beat.

(3) It is possible to modify the present embodiment such that the detection of the chord or tonality is also made in response to the location of bar-line determined by the present embodiment.

(4) It is possible to modify the present embodiment such that instead of visually displaying the score information, the score information is printed on the paper for the user.

Lastly, this invention may be practiced or embodied in still other ways without departing from the spirit or essential character thereof as described above. Therefore, the preferred embodiment described herein is illustrative and not restrictive, the scope of the invention being indicated by the appended claims and all variations which come within the meaning of the claims are intended to be embraced therein.

What is claimed is:

1. A performance-information analyzing apparatus comprising:

supply means for supplying pitch information and note-length information with respect to each sound to be produced, the note-length information representing a time interval to be measured between a key-on timing of a current sound and a key-on timing of a next sound; and selection means for selecting a pair of time and location of bar-line, which is suited to a predetermined condition, from among multiple pairs of time and location of bar-line, which are different from each other, on the basis of the note-length information.

2. A performance-information analyzing apparatus according to claim 1, wherein the selection means selects the pair of time and location of bar-line dependent on a number of occurrences of the note-length information.

3. A performance-information analyzing apparatus comprising:

input means for inputting performance information which at least contains a key-on timing and a pitch with respect to each sound to be produced;

note-length calculating means for calculating a note length on the basis of a key-on interval representative of a time interval between two key-on timings;

selection means for selecting the note length, based on a number of occurrences of the note length, from among a plurality of note lengths sequentially calculated responsive to a plurality of sounds to be produced;

determination means for automatically determining a pair of time and location of bar-line, which is suitable for a predetermined condition, on the basis of the note length selected by the selection means.

4. A performance-information analyzing apparatus according to claim 3 further comprising visual display means for visually displaying a score which is formed on the basis of the performance information and the pair of time and location of bar-line which is automatically determined by the determination means.

5. A performance-information analyzing apparatus according to claim 3 further comprising counting means for counting a number of notes which have a same pitch and which indicate a continuous sound to be described between two measures across a bar-line in a score, so that the determination means automatically determines the pair of time and location of bar-line under consideration of the number counted, whereby the continuous sound is represented by two or more notes with a tie across the bar-line in the score.

* * * * *